(12) United States Patent
Garza et al.

(10) Patent No.: US 9,442,781 B2
(45) Date of Patent: Sep. 13, 2016

(54) OPTIMISTIC PROCESSING OF MESSAGES IN A MESSAGING SYSTEM

(75) Inventors: Jose Emir Garza, Richmond (GB); Stephen James Hobson, Middlesex (GB)

(73) Assignee: International Business Machines Corporation, Armonk, NY (US)

( * ) Notice: Subject to any disclaimer, the term of this patent is extended or adjusted under 35 U.S.C. 154(b) by 1384 days.

(21) Appl. No.: 11/531,726

(22) Filed: Sep. 14, 2006

(65) Prior Publication Data

US 2007/0067313 A1    Mar. 22, 2007

(30) Foreign Application Priority Data

Sep. 17, 2005    (GB) .................................. 0519033.5

(51) Int. Cl.
*G06F 3/00* (2006.01)
*G06F 9/54* (2006.01)

(52) U.S. Cl.
CPC ......... *G06F 9/546* (2013.01); *G06F 2209/548* (2013.01)

(58) Field of Classification Search
USPC ......................................................... 719/314
See application file for complete search history.

(56) References Cited

U.S. PATENT DOCUMENTS

| | | | |
|---|---|---|---|
| 4,665,520 A | 5/1987 | Strom et al. | |
| 5,485,608 A * | 1/1996 | Lomet et al. | |
| 5,878,056 A * | 3/1999 | Black et al. | 714/748 |
| 6,154,847 A * | 11/2000 | Schofield | G06F 11/1471 714/20 |
| 6,397,352 B1 | 5/2002 | Chandrasekaran et al. | |
| 6,401,136 B1 | 6/2002 | Britton et al. | |
| 6,862,595 B1 * | 3/2005 | Elko et al. | 707/10 |
| 2004/0153511 A1 * | 8/2004 | Maynard | G06F 9/546 709/206 |
| 2004/0215998 A1 * | 10/2004 | Buxton et al. | 714/2 |
| 2005/0060374 A1 * | 3/2005 | Phillips | G06F 9/546 709/206 |
| 2006/0294333 A1 * | 12/2006 | Michaylov | G06F 9/466 711/168 |

OTHER PUBLICATIONS

Todd, Stephen, et al., Controlled Optimistic Processing, Especially in a Message System, IBM Research Disclosure, Published IP.Com Sep. 16, 2002, 5 pages.

* cited by examiner

*Primary Examiner* — H S Sough
*Assistant Examiner* — Carina Yun
(74) *Attorney, Agent, or Firm* — Jordan IP Law, LLC (57) ABSTRACT

For processing messages in a messaging system comprising a source and a destination queue manager, an uncommitted message is received from an application at the source queue manager. This is transmitted to the destination queue manager and received thereat. When it is determined that the message is uncommitted, it is stored in memory, rather than placing the message on a receive queue for processing by another application. If it is determined that the uncommitted message has been committed by the application which originated the uncommitted message, then it is placed on the receive queue.

19 Claims, 5 Drawing Sheets

OPTIMISTIC PROCESSING OF MESSAGES IN A MESSAGING SYSTEM

FIELD OF THE INVENTION

The invention relates to the optimistic processing of messages in a messaging system.

BACKGROUND

Message oriented middleware (MOM) supports asynchronous communication between applications through queues. A producing application (program) can send (PUT) a message to a named queue from which a consuming application can receive (GET) the message.

The process is asynchronous in that the MOM takes responsibility for the message between the sending application's PUT and the consuming application's GET. Thus, the sending application can complete successfully even if the receiving application is unavailable, perhaps not running, and later the receiving application can GET the message even if the sending application is no longer available.

In a network of computers, the MOM permits an application running in one computer, the local computer, to send a message to a queue that resides in a different computer, the remote computer.

Figure 1:
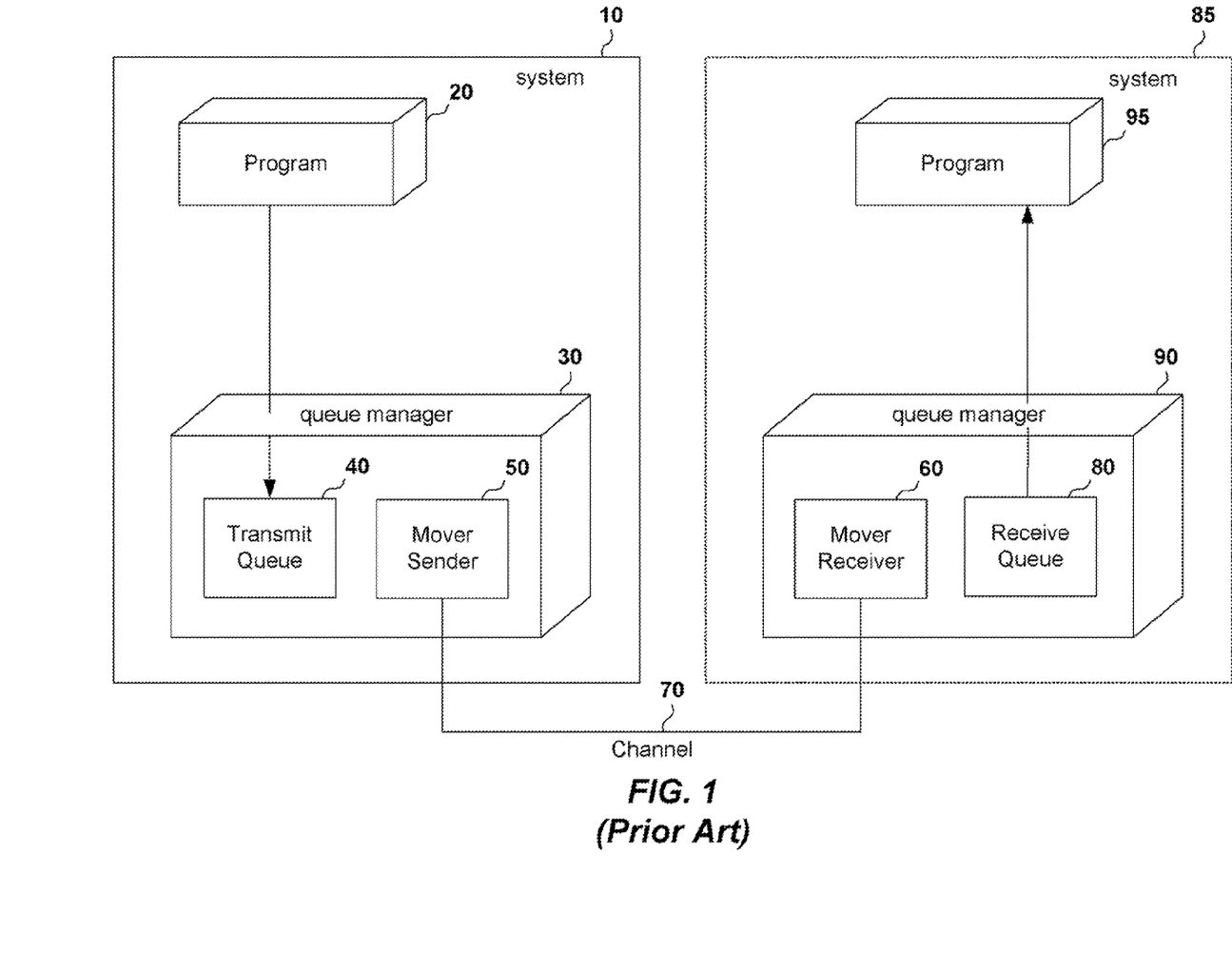
FIG. 1 depicts a typical messaging system as is known in the art.

FIG. 1 provides an example of such a messaging system. A program 20 PUTs a message to a "holding" queue 40 on sending or source queue manager 30 at local computer 10. This queue is called the transmit queue.

At an appropriate time, that is, at least when the MOM is operational on the remote computer and the communication link or channel to that computer is operational, the queue manager transfers the message from the local computer to remote computer 85 over channel 70 using mover sending software 50.

Mover receiving software 60 on receiving or destination queue manager 90 at the remote computer 85 receives the message and adds the message to the actual target or receive queue 80.

When program 20 issue its PUT or PUTs to the remote queue within a transaction, the queue manager 30 in the local computer adds the message to the transmit queue 40 within that transaction. It does not transfer the message or messages to the remote computer 85 until program 20 commits its transaction. The messages on transmit queue 40 do not become visible to the mover sending software 50 until program 20 has committed the transaction containing those messages.

A consequence of this is that all messages PUT within a transaction are held until commit time, and then all become available for transmission simultaneously. This has at least the following drawbacks:

i) Latency: If a transaction emits a number of messages then transmission will not start for any of the messages until the transaction commits. This equates to T+N+M, where T is the time when the application issues the PUT, which may be after when the transaction has started; N is the time interval between the PUT and the COMMIT; and M is the time taken to transmit the message.

ii) Unequal load: The transmission load imposed by a transaction is unequal in the sense that there are relatively large gaps pending transaction completion, followed by relatively large clumps of the messages in the transaction. This pattern of use is known to reduce the effective throughput of the communication link to the detriment of all traffic on that link.

Publication "Controlled optimistic processing, especially in a message system" disclosed by IBM on 16 Sep. 2002 (at priorart.ip.com—IPCOM000016201D) discloses a solution enabling the reading of uncommitted messages or other resources.

U.S. Pat. No. 4,665,520 discloses a system which may perform optimistic commitments of messages by sending uncommitted messages out. The database at the other end will be designed to run a transaction and to wait for a final signal to commit or abort. Additionally commit or abort signals are provided whenever a particular output message becomes committable or is recognized to be an orphan message.

The problem with the solution of the U.S. Pat. No. 4,665,520 is that the database has to be designed to cope with the situation in which its optimistic processing of a transaction is not valid. In other words the database must be able to back out of the transaction upon request. Thus the processing of the database is changed.

SUMMARY

According to a first aspect, there is provided a method for queue manager to process messages optimistically, the method comprising: receiving an uncommitted message from a source queue manager, the uncommitted message forming part of a transaction; responsive to determining that the queue manager is a destination queue manager and that the message is uncommitted, storing the message in memory; and responsive to a determination that the uncommitted message has been committed by the application which originated the message, placing the transaction's messages on a receive queue for processing therefrom.

In a preferred embodiment an indication is transmitted that the message is uncommitted from the source queue manager to the destination queue manager. Such an indication may be transmitted as extra information along with the message. This is preferable to having an additional transmission. Such extra information may indicate that the transaction under which the message was PUT is uncommitted and may also identify the transaction.

The message comprises part of a transaction and in order to store the message in memory, it is determined whether the destination queue manager is aware of other messages in the transaction. Responsive to a positive determination, the received message is added to a list of the other messages. Responsive to a negative determination, a new list for the transaction is started. The list may be a linked list.

In a preferred embodiment, when an indication is received at the destination queue manager that a transaction including the received message is to be committed, all messages in the list associated with the transaction are retrieved from memory and moved to the receive queue.

In a preferred embodiment, when an indication is received at the destination queue manager that a transaction including the received message is to be undone, all messages in the list associated with the transaction are deleted from memory. Note the term "undone" is intended to encompass both rollback and abort.

In one embodiment one or more old messages may be deleted from memory in order to free up space for newly received messages at the destination queue manager, for example using a "least recently used" cache.

With a least recently used discard mechanism, the sending queue manager is relieved of the obligation to notify the receiving queue manager when an uncommitted transaction backs out; the uncommitted messages will eventually get discarded anyway. Without a least recently used discard mechanism, the sending queue manager must harden information about any uncommitted transactions in case the sending queue manager fails, so that it can send the backout message when it restarts. Such a solution is less preferable because the hardening operation or logging is expensive.

In the LRU embodiment, if a notification is received that a deleted message has been committed, the destination queue manager requests retransmission of the deleted message by the source queue manager.

If a notification is received that a transaction containing a deleted message is to be undone, the notification may be ignored since the transaction is already considered invalid because it contains a deleted message. In any case, using a least recently used discard mechanism, then the backout notification can be ignored since the messages will be discarded in due course anyway.

In one embodiment the queue manager is an intermediate queue manager. The received uncommitted message is forwarded on its way to the destination queue manager unless a transmission path or channel is unavailable. If the path is unavailable, then the uncommitted message is stored in memory associated with the intermediate queue manager.

When it is determined that the transmission path is available, the uncommitted message may be retrieved from memory and forwarded on its way to the destination queue manager.

Responsive to receiving an indication that the uncommitted message has been committed, the uncommitted message may be retrieved from memory and forwarded on its way to the destination queue manager. Note that the transmission path may still be unavailable. In that case the message is marked committed and moved to the transmission queue ready for transmission.

If an indication is received at the intermediate queue manager that the transaction containing an uncommitted message is to be undone all messages in the list associated with the transaction can be deleted from memory.

According to another aspect, there is provided an apparatus for a queue manager to process messages optimistically, the apparatus comprising: means for receiving an uncommitted message from a source queue manager, the uncommitted message forming part of a transaction; means, responsive to determining that the queue manager is a destination queue manager and that the message is uncommitted, for storing the message in memory, and means, responsive to a determination that the uncommitted message has been committed by the application which originated the message, for placing the transaction's messages on a receive queue for processing therefrom.

According to another aspect, the invention is implemented in computer software. For example, a computer program product may be provided for a queue manager to process messages optimistically, wherein the computer program product includes a computer readable storage medium having computer readable program code tangibly embedded therein. The computer readable program code can have computer readable program code configured to receive an uncommitted message from a source queue manager, wherein the uncommitted message forms part of a transaction. The computer readable program code may also be configured to, responsive to determining that the queue manager is a destination queue manager and that the message is uncommitted, store the message in memory. In addition, the computer readable program code can be configured to, responsive to a determination that the uncommitted message has been committed by an application which originated the message, place the message on a receive queue for processing therefrom.

According to another aspect there is provided a method for processing messages in a messaging system comprising a source and a destination queue manager, the method comprising: receiving an uncommitted message from an application at the source queue manager, the uncommitted message forming part of a transaction; transmitting the uncommitted message to the destination queue manager; receiving the uncommitted message at the destination queue manager; responsive to determining that the message is uncommitted, storing the message in memory; responsive to a determination that the transaction owning the uncommitted message has been committed by the application which originated the uncommitted message, placing the transaction's messages on the receive queue.

BRIEF DESCRIPTION OF THE DRAWINGS

A preferred embodiment of the present invention will now be described, by way of example only, and with reference to the following drawings, wherein.

DETAILED DESCRIPTION

As discussed in the background section, a solution which permits optimistic processing of a transaction by a remote computer can prove problematic. Reasons why optimistic processing can be problematic in a messaging environment will now be discussed.

Referring to FIG. 1, imagine the situation in which a message becomes accessible to the move sending software 50 as soon as it is placed on transmit queue 40. Consequently each message is transmitted as soon as it is placed on queue 40, provided that the communications link or channel 70 is willing. Mover receiver software 60 then places each message received via channel 70 onto receive queue 80 for retrieval by program 95.

As indicated above, application software (the database in the background section) has to be able to cope with a back out of the transaction. Further, in the messaging scenario, queue manager 90 also has to be able to deal with uncommitted messages.

If messages in a transaction are sent only when a sending program commits, then the messages will arrive altogether at the receiving end and will be placed on queue 80 as one batch. However, the transmission of uncommitted messages means that queue 80 may contain a plurality of uncommitted transactions and that messages from one uncommitted transaction may be interspersed with messages from other uncommitted and committed transactions. The logic to cope with multiple uncommitted transactions in general, along with the ability to back out such transactions, is complicated.

To start with, each transaction typically has a different ID at the sender end (system 10) compared with the receiver end (system 85). Information regarding each transaction has to be held in memory at the receiver end. Every time a new message is received, it has to be determined to which transaction that message belongs, if the transaction already exists, or a new transaction containing the message has to be created. Context is continually having to be switched, suspended, and resumed between the differing transactions. Backing out such uncommitted transactions is also difficult since the id of the transaction at the receiving end must be determined and the appropriate messages located on the receive queue 80. The situation is additionally complicated if an application has retrieved messages from an uncommitted transaction and started processing these messages.

Consequently, there is disclosed herein a solution which addresses the problems of transmitting uncommitted messages from a sending end to a receiving end using message orientation middleware.

Figure 2A:
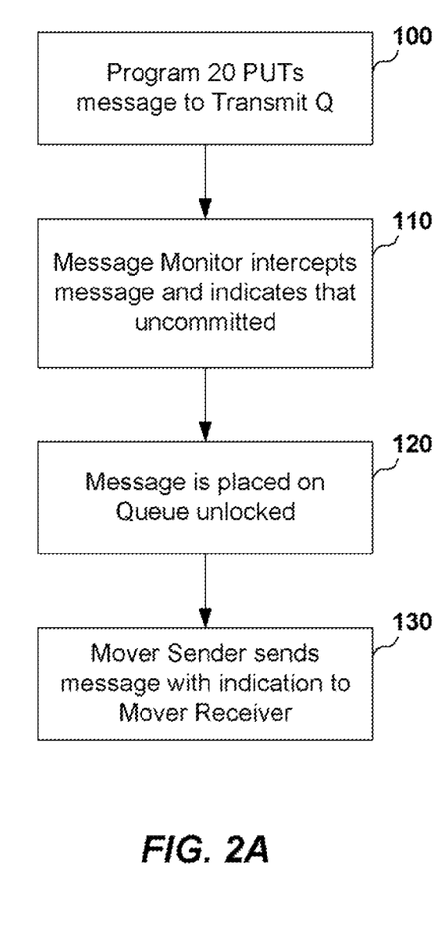
FIGS. 2a, 2b, 2c and 2d illustrate the processing and components of a sending queue manager in accordance with a preferred embodiment of the present invention.
Figure 2B:
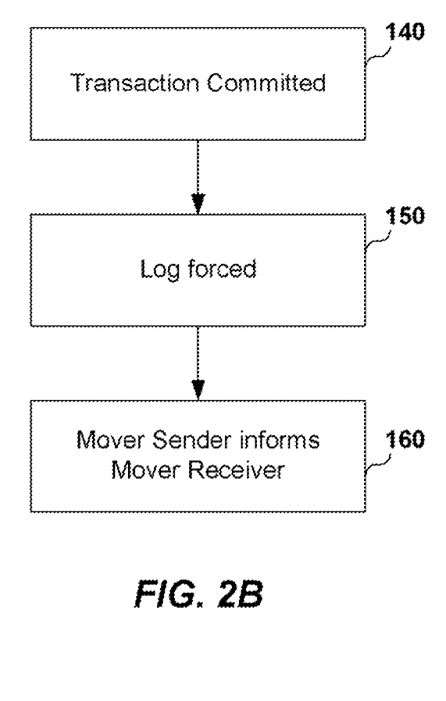
Figure 2C:
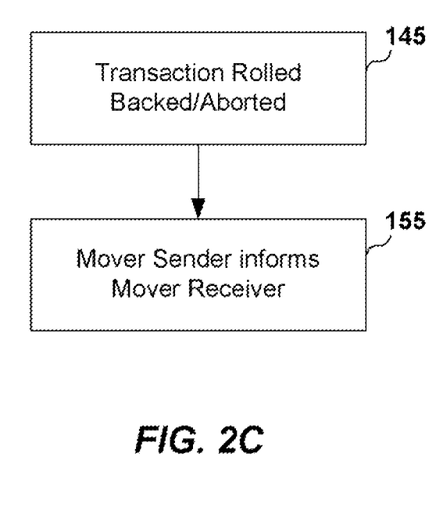
Figure 2D:
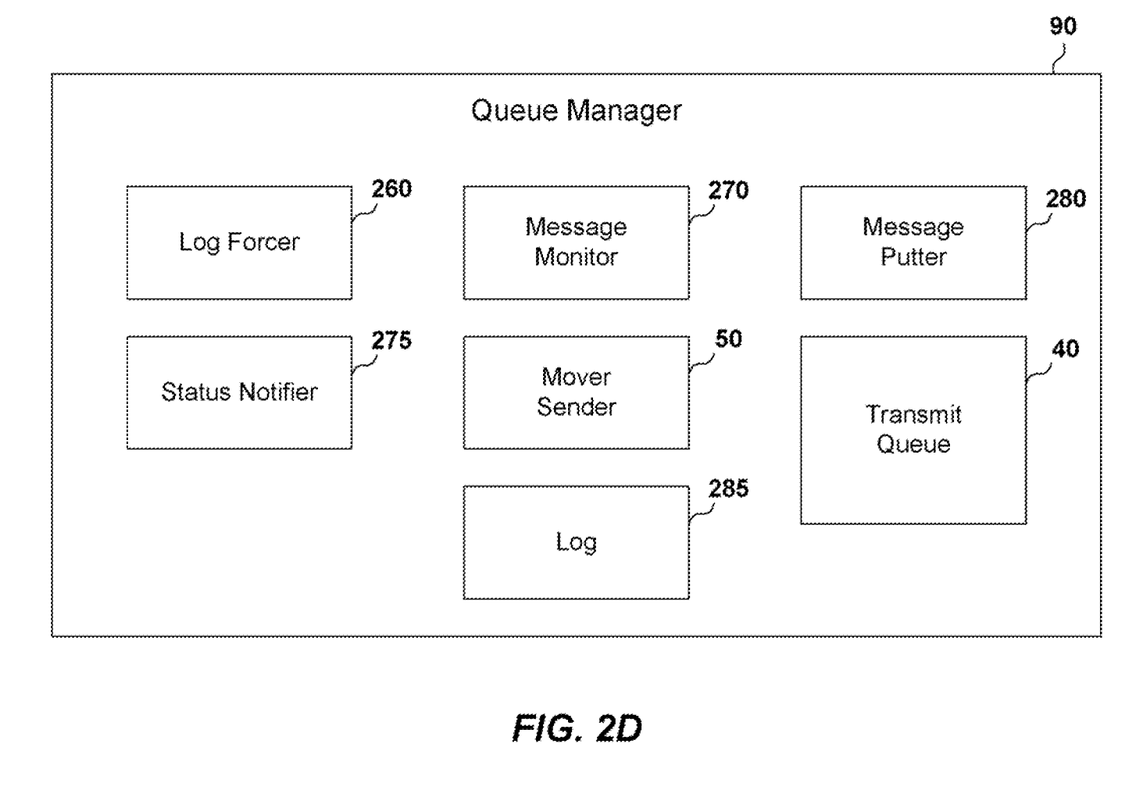
Figure 3A:
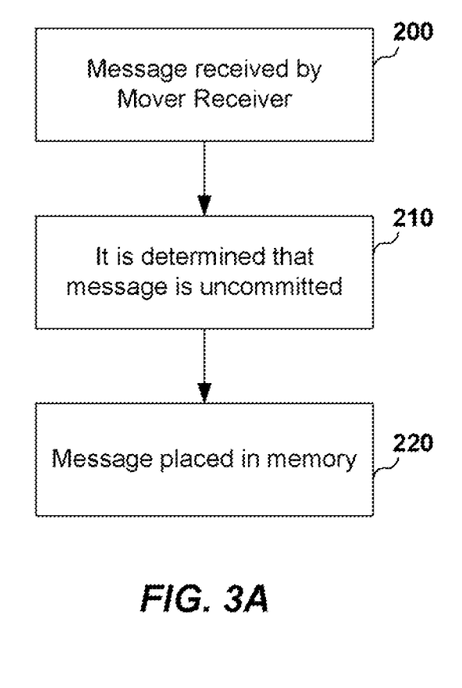
FIGS. 3a, 3b, 3c and 3d illustrates the processing and components of a receiving queue manager in accordance with a preferred embodiment of the present invention.
Figure 3B:
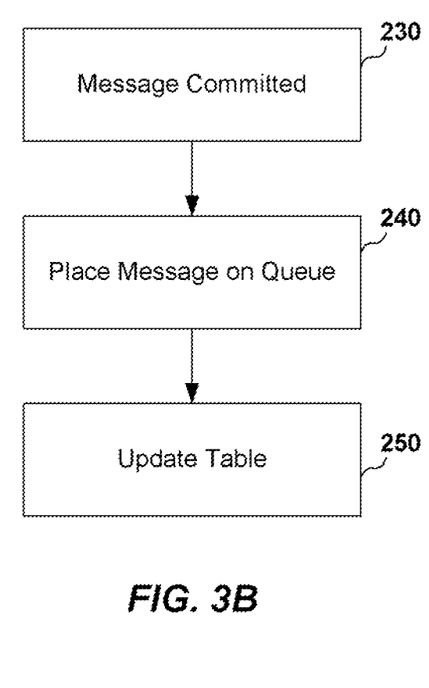
Figure 3C:
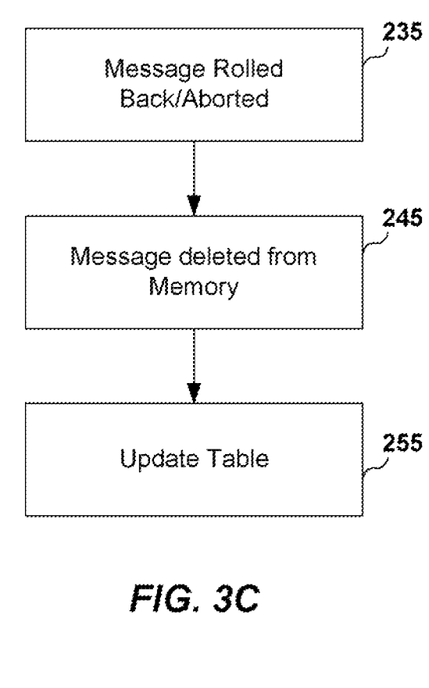
Figure 3D:
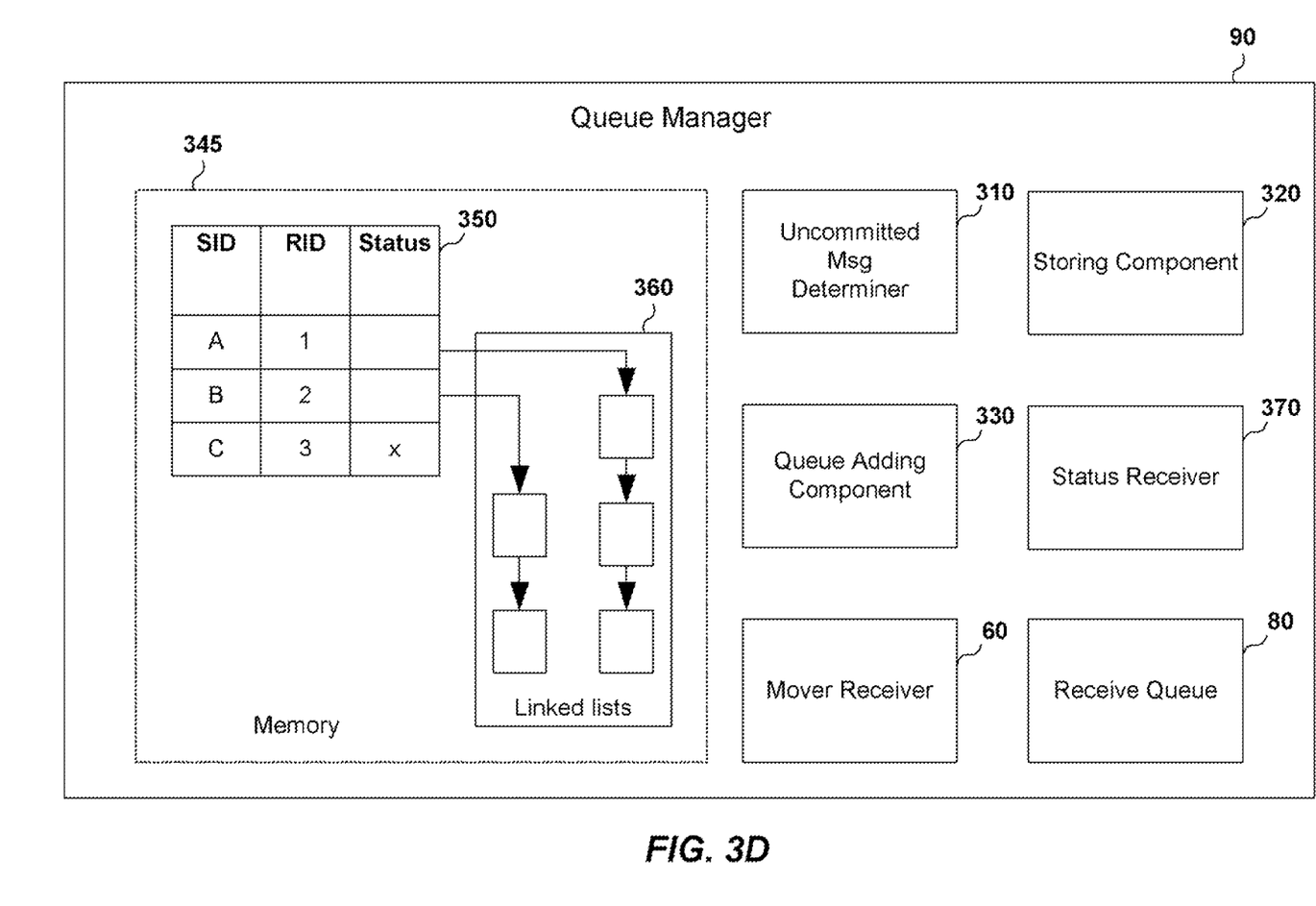

FIGS. 2a, 2b, 2c and 2d illustrate the processing and components of a sending queue manager in accordance with a preferred embodiment of the present invention. FIGS. 3a, 3b, 3c and 3d illustrate the processing and components of a receiving queue manager in accordance with a preferred embodiment. The figures should be read in conjunction with one another. The basic components is the same as FIG. 1 and so this figure will also be referenced. FIGS. 2d and 3d however discuss some of the additional components present in the sending and receiving queue managers.

Program 20 PUTs a message to transmit queue 40 (step 100). This message forms part of a transaction and typically the message would not be made visible, i.e., unlocked, immediately for the mover sending software 50 to transmit the message to the receiving system 85. Rather, queue manager 10 would wait for program 20 to commit the transaction including the message. Notification of the commit would then cause transaction software within the queue manager to force the transaction to a log. Once this had been done, the transaction software would unlock any messages pertaining to the committed transaction and they would thus become visible to the mover sending software 50.

In accordance with a preferred embodiment, however, the message is PUT by program 20 and is intercepted by a message monitor 270 (step 110). The message monitor marks the message to indicate that it is uncommitted and also marks it with a transaction identifier such as the SID referred to below. The message is then placed on the queue in an unlocked, i.e., visible, state by message putter component 280 (step 120). Since the message is in an unlocked state on the queue, it is immediately visible to mover sending softward 50. It is also recognizable as uncommitted due to the mark left by the message monitor 270.

The mover sending software transmits the message to the destination queue manager 90 with an indication that the message is uncommitted (step 130).

The message is received at queue manager 90 by mover receiving software 60 (step 200). Component 310, which may be part of the mover receiving software component 60, determines that the newly received message is uncommitted (step 210), and storing component 320 places the message in memory 345, rather than onto receive queue 80 (step 220).

Memory 345 comprises a table 350 containing details of all uncommitted messages. Each message comprises part of a transaction having an assigned sending id (SID) at the sending queue manager 30. This is correlated in the table with a receiving queue manager id (RID) which is assigned when a new transaction is received at queue manager 90. Thus each entry in the table relates to a different transaction. Each entry points towards a linked list 360 of uncommitted messages owned by that transaction. Storing component 320 is preferably also responsible for ensuring that table 350 is up to date.

Once a message has been placed in memory, at some later point, status receiver 370 is informed by the sending queue manager, which is represented here as status notifier component 275, that the transaction owning the message has been committed (step 230).

At the sending end, status notifier is waiting for notification from transaction software (not shown) of transaction commitment (step 140). When a transaction containing the message is committed, log 285 is then forced by Log Forcer 260 (step 150). The status notifier is informed that a set of message constituting a transaction have been committed, and it is then up to this software to inform the receiving queue manager 90 of this fact (step 160).

Note, messages are deleted from the transmit queue only once the receiving queue manager has been told to commit the messages and has confirmed that this has been done. The mover sending software may perform such deletion.

When a notification is received at the receiving queue manager 90, status receiver 370 receives this (step 230). The complete linked list 360 of messages for the committed transaction is then placed on receive queue 80 by Queue Adding Component 330 (step 240) for retrieval (GETTING) by program 95. The table in memory then has to be updated by storing component 320 to remove reference to the committed transaction and its associated linked list 360 of messages (step 250).

Note that a single transaction, represented here as a single linked list 360, can contain different messages destined for different queues. Possibly, indeed probably, if there are multiple target queues, these will be consumed by different applications 95. The single commit of the transaction thus causes the queue adding component 330 to put messages all in one transaction onto one or more target queues.

On the other hand, the sending queue manager may receive notification from transaction software (not shown) that a transaction has been rolled back/aborted program 20. If the transaction has been aborted/rolled back by the PUTTING program 20, then the status notifier informs the status receiver 370 that the transaction is to be aborted/rolled back (step 155).

At the receiving queue manager 90, status receiver receives notification that the transaction is to be aborted/rolled back. The linked list 360 pertaining to the transaction is deleted from memory (step 245). Once again the table has to be updated (step 255). Both steps 245 and 250 are performed by storing component 320.

It will be appreciated that in certain scenarios, storage or memory may be at a premium. Thus, a volatile cache such as a least recently used (LRU) cache may be used to store each transaction's messages. With such a cache, the storing component 320 is permitted to delete the oldest messages in order to make room for newly received messages. This is permitted before a signal is received form the sending queue manager to indicate that the transaction owning such messages has been committed, i.e., resolved. If the status receiver receives a commit signal for a message that is no longer in its cache, it simply requests the mover sending software 50 to retransmit the message. If the status receiver receives a rollback or abort signal for a message that is no longer in its cache, it can ignore the signal.

Note that it is preferable to delete the complete linked list of messages for a transaction but to leave the entry for the transaction in table 350. This entry can then be marked in a status column as invalid (x) and thus the system is aware of a problem if additional messages for an invalid transaction are received. Such additional messages can then be immediately discarded.

Thus far, the invention has been described in terms of a single source or sending queue manager and a single destination or receiving queue manager.

A scenario is also envisaged where one or more intermediate queue managers act as store and forward nodes between the source and destination queue managers 30, 90.

The techniques described above for the two queue manager case will also work for this scenario. The first intermediate queue manager can behave as described above for the destination queue manager. In fact, this is the preferred behavior at an intermediate queue manager when the forward path to the destination or the next intermediate is not available.

If the forward path from an intermediate queue manager is available, the behavior at that intermediate queue manager can be modified as follows:

When the intermediate queue manager receives the uncommitted message, it does not cache it, but instead adds it, as an uncommitted message, to the appropriate transmit queue for the forward path. In this way, the uncommitted message can be propagated as far as possible, which is likely to be as far as the destination queue manager, where the message is cached as described above.

The transaction resolution or commit signal is propagated along the same path until it reaches either an intermediate queue manager with a cached copy of the message or until it reaches the destination queue manager.

For rollback or abort, any recipient with a cached copy of the message discards that copy. If no queue manager has a cached copy, the signal will propagate to the destination queue manager which can safely ignore the signal.

For commit, any recipient with a cached copy processes that cached copy. An intermediate queue manager does this by adding the message to the appropriate transmit queue; the destination queue manager does it by adding the message to the target queue. If no queue manager has a cached copy, the signal will propagate to the destination queue manager which requests retransmission of the message. This retransmission request must be propagated back to the origin queue manager.

Note that an intermediate queue manager does not have to wait for a commit signal before moving a cached copy of a message onto its transmit queue. Instead a test could be performed to determine when a previously unavailable transmit path or channel becomes available. At this point cached messages may be moved onto the intermediate queue manager's transmit queue.

Further note that a queue manager will have to keep track of whether it is acting as a destination or intermediate queue manager in order that it knows how to behave. A queue manager will be able to tell whether it is an intermediate queue manager or not since it will be able to determine whether a message has its address or the address of another queue manager listed.

The solution of transmitting uncommitted messages is particularly advantageous because the deliver time for the last message becomes T+max(N,M), rather than T+N+M. T is the time when the application issues the PUT, which may be after when the transaction started); N is the time interval between the PUT and the COMMIT; and M is the time taken to transmit the message. Max(N,M) means which ever is the greater of N and M.

Placing uncommitted messages into memory, rather than adding them directly to the queue, enables the processing at a receiving queue manager to be less complex. The receive queue does not comprise uncommitted messages from different transactions entwined with one another, alongside committed transactions. A transaction's messages are all moved from memory to the appropriate queue only when the transaction is actually committed, unless the queue manager is an intermediate queue manager. The processing program can be sure that once a transaction is available for getting from receive queue 80, it will not be rolled back or aborted. Consequently, the processing program does not need to be able to cope with such eventualities.

What is claimed is:

1. A method for a receiving queue manager to process messages optimistically, the method comprising:
  receiving, from a source queue manager, an indication that a message which forms part of a transaction is uncommitted;
  determining from the message itself that the message is uncommitted;
  storing, in response to the determination that the message is uncommitted, the message in memory, the memory having a table containing details of all uncommitted messages which form other parts of the transaction, the uncommitted messages having an assigned sending identification at the source queue manager that is correlated in the table with a receiving queue manager identification which is assigned when a new transaction is received at the receiving queue manager;
  placing, in response to a determination that the transaction has been committed by an application which originated the message, the list of messages, including the uncommitted message, on a receive queue for processing therefrom;
  removing, in response to placing the message of the transaction on a receive queue, reference to the transaction and an associated linked list of messages by updating the table; and
  deleting, in response to receiving at the destination queue manager an indication that the transaction including the message is to be undone, the transaction from the memory;
  wherein the table contains a plurality of entries, each of the plurality of entries contains a specific assigned sending identification and a specific receiving queue manager identification for a specific transaction, and each of the specific sending identification and the specific receiving queue manager identification point to a separate linked list of uncommitted messages owned by the specific transaction, and
  wherein each of the linked list of uncommitted messages represents a single transaction.

2. The method of claim 1, wherein storing the message in memory comprises determining whether the other uncommitted messages in the transaction are known.

3. The method of claim 2, wherein storing the message in memory comprises adding, in response to a positive determination, the message to the list.

4. The method of claim 1, comprising:
  deleting old messages from the memory in order to free up space for newly received messages at the destination queue manager;
  receiving notification that a deleted message has been committed; and
  requesting retransmission of the deleted message by the source queue manager.

5. The method of claim 1, comprising:
  receiving the uncommitted message at an intermediate queue manager;

forwarding the message as an uncommitted message on its way to the destination queue manager unless a transmission path is unavailable; and responsive to the transmission path being unavailable, storing the uncommitted message in memory associated with the intermediate queue manager.

6. The method of claim 1, comprising:

responsive to determining that the receiving queue manger is an intermediate queue manager, forwarding the message as an uncommitted message on its way to the destination queue manager unless a transmission path is unavailable; and responsive to a transmission path being unavailable, storing the uncommitted message in memory associated with the intermediate queue manager.

7. The method of claim 1, comprising, updating the list in memory to remove reference to the committed transaction and the list of messages.

8. An apparatus for a receiving queue manager to process messages optimistically, the apparatus comprising:

a processor;

a memory, operatively coupled to the processor, and having stored thereon instructions executable by the processor to:

receive an uncommitted message from a source queue manager, the uncommitted message forming part of a transaction;

store, in response to a determination that the received message is uncommitted, the message in memory containing a list of uncommitted messages which form other parts of the transaction, the uncommitted messages having an assigned sending identification at the source queue manager that is correlated in a table with a receiving queue manager identification which is assigned when a new transaction is received at the receiving queue manager, remove, in response to a placement of the message of the transaction on a receive queue, reference to the transaction and an associated linked list of messages by updating the table, delete, in response to receipt at a destination queue manager, of an indication that the transaction including the received message is to be undone, the transaction from the memory; and in response to a determination that the transaction has been committed by an application which originated the message, place the list of messages, including the uncommitted message, on a receive queue for processing therefrom;

wherein the table contains a plurality of entries, each of the plurality of entries contains a specific assigned sending identification and a specific receiving queue manager identification for a specific transaction, and each of the specific sending identification and the specific receiving queue manager identification point to a separate linked list of uncommitted messages owned by the specific transaction, and wherein each of the linked list of uncommitted messages represents a single transaction.

9. The apparatus of claim 8, wherein, responsive to receiving, at the destination queue manager, an indication that the transaction including the received message is to be undone, a storing component is configured to delete the transaction from the memory.

10. The apparatus of claim 9, wherein the storing component is configured to also update the list in memory to remove reference to the committed transaction and the list of messages.

11. A computer program product for a receiving queue manager to process messages optimistically, the computer program product comprising:

a non-transitory computer readable storage medium having computer readable program code tangibly embedded therein, the computer readable program code configured to:

receive, from a source queue manager, an indication that a message which forms part of a transaction is uncommitted;

in response to a determination that the message is uncommitted, store the message in memory, the memory having a table containing details of all uncommitted messages which form other parts of the transaction, the uncommitted messages having an assigned sending identification at the source queue manager that is correlated in the table with a receiving queue manager identification which is assigned when a new transaction is received at receiving queue manager;

in response to a determination that the transaction has been committed by an application which originated the message, place the list of messages, including the uncommitted message, on a receive queue for processing therefrom;

in response to placing the message on a receive queue, remove reference to the transaction and an associated linked list of messages by updating the table; and in response to receiving, at the destination queue manager, an indication that the transaction including the message is to be undone, delete the transaction from memory;

wherein the table contains a plurality of entries, each of the plurality of entries contains a specific assigned sending identification and a specific receiving queue manager identification for a specific transaction, and each of the specific sending identification and the specific receiving queue manager identification point to a separate linked list of uncommitted messages owned by the specific transaction, and wherein each of the linked list of uncommitted messages represents a single transaction.

12. The computer program product of claim 11, wherein the computer readable program code is configured to receive an indication that the message is uncommitted from the source queue manager.

13. The computer program product of claim 11, wherein the computer readable program code is configured to determine from the message itself that the message is uncommitted.

14. The computer program product of claim 11, wherein the computer readable program code is configured to:

determine whether other messages in the transaction are known about by the destination queue manager; and responsive to a positive determination, add the message to a list of the other messages.

15. The computer program product of claim 11, wherein the computer readable program code is configured to update the list in memory to remove reference to the committed transaction and the list of messages.

16. The computer program product of claim 11, wherein the computer readable program code is configured to:

receive, at the destination queue manager, an indication that the transaction including the received message is to be undone; and delete the transaction from the memory.

17. The computer program product of claim 11, wherein the computer readable program code is configured to:

delete old messages from the memory in order to free up space for newly received messages at the destination queue manager;

receive notification that a deleted message has been committed; and request retransmission of the deleted message by the source queue manager.

18. The computer program product of claim 11, wherein the computer readable program code is configured to:

receive the uncommitted message at an intermediate queue manager;

forward the message as an uncommitted message on its way to the destination queue manager unless a transmission path is unavailable; and responsive to the transmission path being unavailable, store the uncommitted message in memory associated with the intermediate queue manager.

19. The computer program product of claim 11, wherein the computer readable program code is configured to:

responsive to determining that the receiving queue manager is an intermediate queue manager, forward the message as an uncommitted message on its way to the destination queue manager unless a transmission path is unavailable; and responsive to a transmission path being unavailable, store the uncommitted message in memory associated with the intermediate queue manager.

* * * * *